E. F. KAPUS.
ACETYLENE GAS MACHINE.
APPLICATION FILED JUNE 7, 1910.
979,509.
Patented Dec. 27, 1910.
3 SHEETS—SHEET 1.
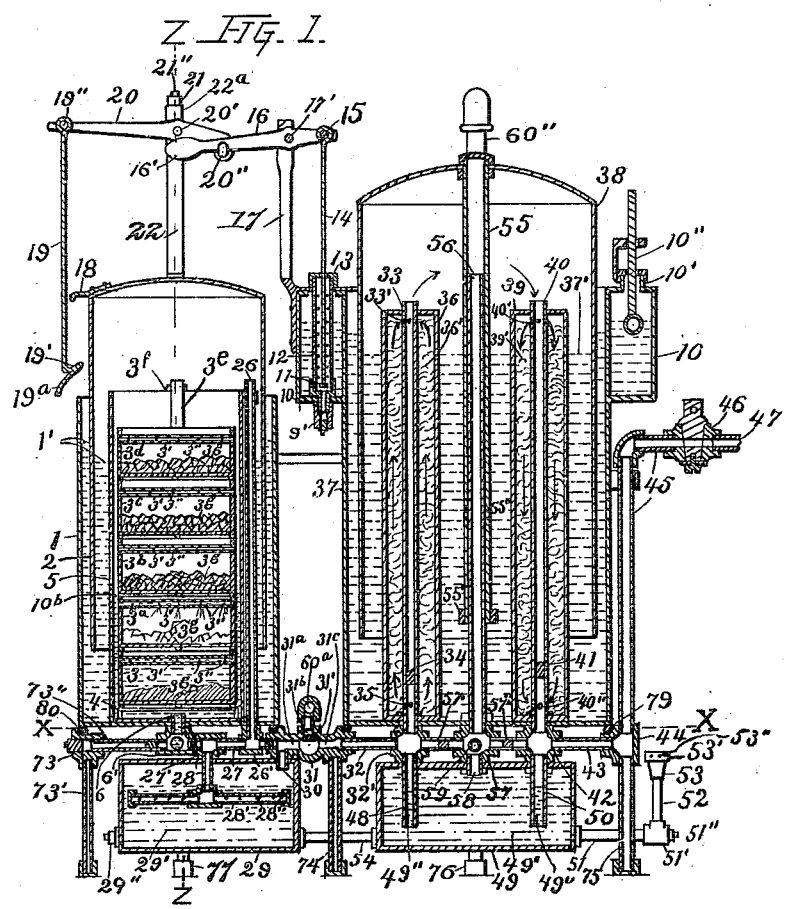
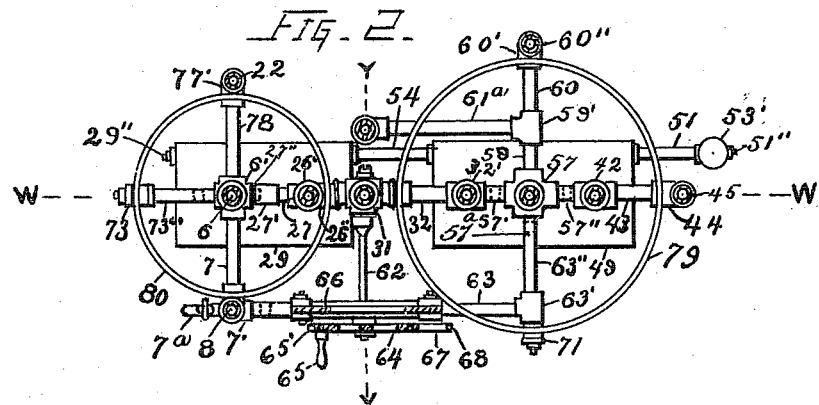
WITNESSES:
Luke E. Hinton.
John J. Hinton
INVENTOR
Edward F. Kapus
BY
George W. Hinton
ATTORNEY.

E. F. KAPUS.
ACETYLENE GAS MACHINE.
APPLICATION FILED JUNE 7, 1910.
979,509.
Patented Dec. 27, 1910.
3 SHEETS—SHEET 2.
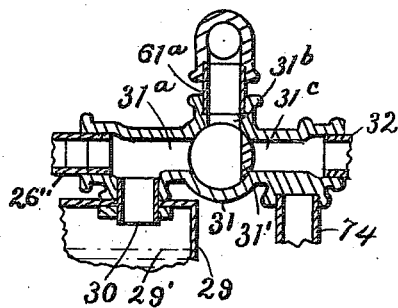
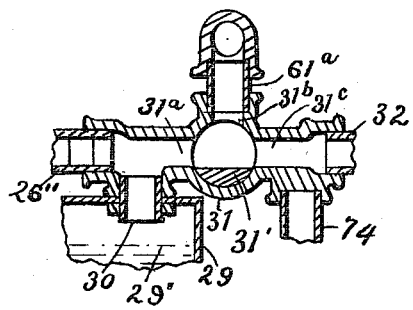
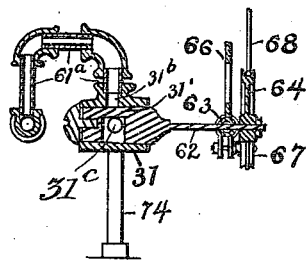
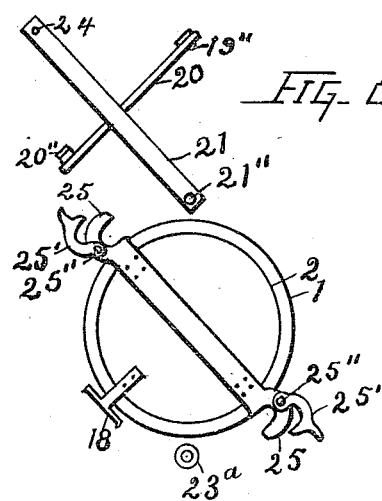
WITNESSES:
John J. Hinton
Gertrude Campion
INVENTOR.
Edward F. Kapus
BY
George W. Hinton
ATTORNEY.

E. F. KAPUS.
ACETYLENE GAS MACHINE.
APPLICATION FILED JUNE 7, 1910.
979,509.
Patented Dec. 27, 1910.
3 SHEETS—SHEET 3.
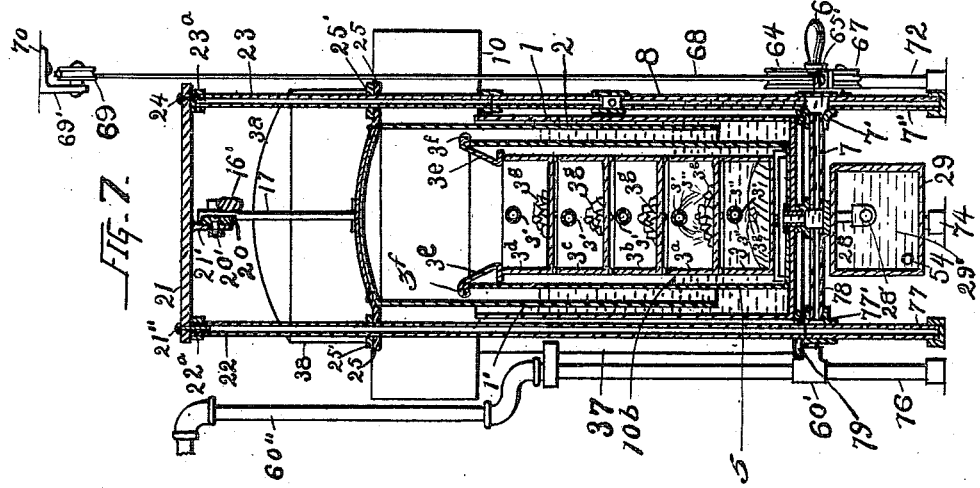
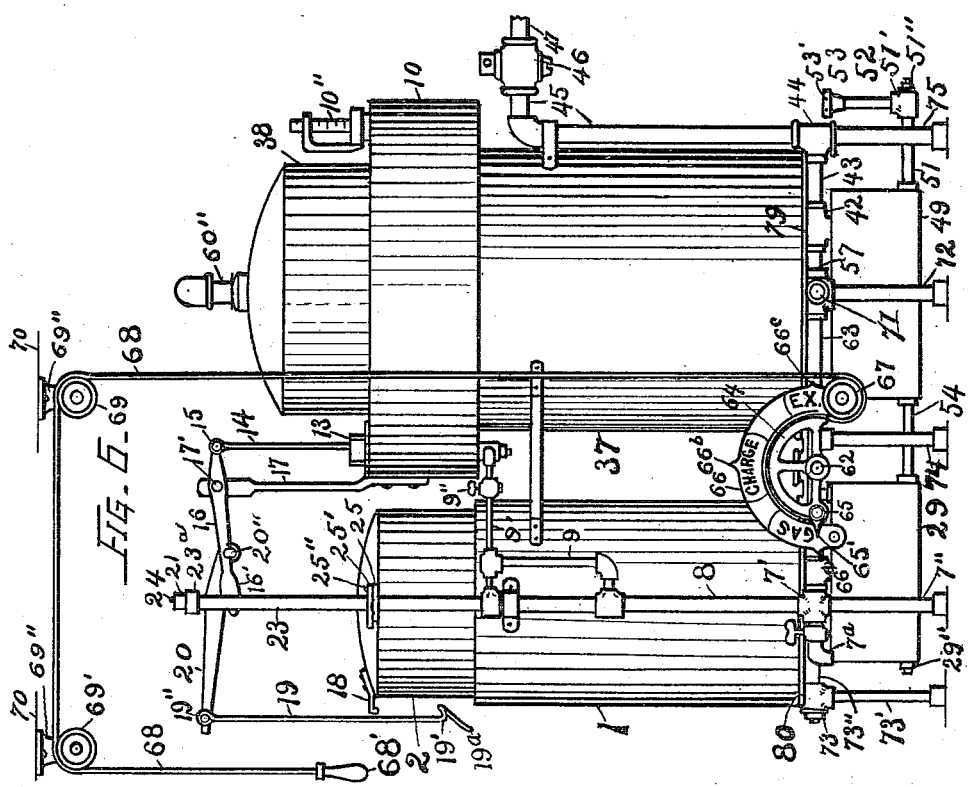
WITNESSES.
John J. Hinton
Luke E. Hinton
INVENTOR.
Edward F. Kapus
BY
George W. Hinton
ATTORNEY.

UNITED STATES PATENT OFFICE.

EDWARD F. KAPUS, OF ST. JOSEPH, MISSOURI.

ACETYLENE-GAS MACHINE.

979,509.  Specification of Letters Patent.  Patented Dec. 27, 1910.

Application filed June 7, 1910. Serial No. 565,591.

*To all whom it may concern:*

Be it known that I, EDWARD F. KAPUS, a citizen of the United States, residing at St. Joseph, in the county of Buchanan and State of Missouri, have invented certain new and useful Improvements in Acetylene-Gas Machines, of which the following is a specification, reference being had therein to the accompanying drawing.

My invention relates to improvements in that class of gas machines, which are designed to generate and store acetylene gas from calcium carbid.

The objects of my improvements are, first; to provide a simple, durable and efficient machine of this character, which shall be comparatively cheap in cost of manufacture, be thoroughly automatic in its operations, and which, under all conditions arising from use, be absolutely safe against the spread of gas therefrom into the room where said machine is installed. Second, to provide means, whereby gas is stored and retained, subject to use, while the generator of the machine is being recharged with fresh carbid. Third; to provide controlling means, operable, either at the machine, or at any desired point, distant therefrom, whereby the gas, generated and stored in the machine, can be promptly exhausted therefrom, into the outside atmosphere when desired, and the further generation of gas and consequent consumption of carbid in the generator be stopped, thus providing means for safety from escaping gas and further generation of same, in case of fire. Fourth; to so construct and arrange the parts of a gas machine, that the gas generated therein, shall have all particles of solid matter and other impurities separated therefrom, and all moisture condensed in the gas conducting pipes thereof, shall gravitate into receptacles provided therefor. Fifth; to so construct the water feeding devices, that water shall automatically be controlled and evenly distributed on the carbid in such manner as to maintain an even and uniform pressure of gas in the machine, while in use, and so that the feeding action of said water and the height of same in the generator shall be visible. Sixth; to provide means whereby all the parts of the machine are readily accessible for recharging, cleaning, and for repairs. Seventh; to so construct the parts of a gas machine that the same may be operated by persons of limited experience, with safety. Eighth; to so construct the framework supporting the machine, that the same is utilized to the farthest extent, as conducting means for gas and water. I attain these objects by the mechanism illustrated in the accompanying drawing, in which:—

Figure 1 is a vertical section, on the line W W, seen in Fig. 2. Fig. 2 is a horizontal section, on the line X X, seen in Fig. 1, looking downward. Figs. 3 and 4 are enlarged sections, similar to Fig. 1, showing two other positions of the gas directing cock gate. Fig. 5 is a vertical section of the gas directing cock and its pipe connections, on the line Y Y, seen in Fig. 2, looking toward the right. Fig. 6 is a front elevation of the machine. Fig. 7 is a transverse section on the line Z Z, seen in Fig. 1, looking toward the right. Fig. 8 is a top plan of the generator, with the parts in position for recharging the same.

The machine comprises a gas generator, scrubber, filters, storage device, a water seal box, gas conducting pipes and gas directing means, all of which are hereinafter fully described.

Referring to Fig. 1, in the generator tank 1 is the water seal 1', in which is submerged the open lower end portion of generator bell 2, adapted to be raised by pressure of gas, therein. Said gas is generated in carbid pans 3, $3^a$, $3^b$, $3^c$ and $3^d$. Said pans are supported on the open stand 4, in generator compartment 5, and are held down therein by pan retainers $3^e$, rotatably secured to the upper edge of compartment 5, by fastenings $3^f$. Compartment 5 holds water $10^b$, surrounding said carbid pans and is provided with water inlet pipe 6, connected by five-way fitting 6' with pipe 7, connected by five way fitting 7' with pipe 8, and provided with drain faucet $7^a$, connected with said fitting 7'. Pipe 8 is connected with glass tube water gage 9, (see Fig. 6,) adapted to show height of water in generator compartment 5, as a water gage therefor, and also adapted to render visible, water being fed therethrough. The upper end of said gage is connected by pipes 9' with feed water tank 10, provided with fill tube 10' and with water depth gage 10''. Pipes 9' are provided with manually operated shut-off cock 9''.

The described parts, provide closable water conducting means, whereby water is conducted from tank 10, into generator compartment 5, in which said water, seen at 10$^b$ rises around carbid pan 3 and flows through tube 3' and thence through perforations 3'' formed therethrough, onto carbid 3$^g$. Tube 3' also serves as a bail, by which to lift and transport said carbid pan. The contact of said water with said carbid generates gas in compartment 5, which passes therefrom into bell 2. Referring to Fig. 1, said water conducting means is provided with the automatically operated valve 11, in water tank 10 adapted to automatically close and open said water conducting means. Said valve is provided with strainer 12, having apertured cap 13 thereon, through which passes valve stem 14, pivotally connected by pivot 15, to one end of valve lever 16, pivotally secured to the upper end of upright 17, by pivot 17'. Formed with the free end of lever 16 is the weight 16', adapted to be lowered by the gravity thereof, and to be lifted by the top of generator bell 2, for opening and closing valve 11, thus forming automatic opening and closing means for opening and closing said valve.

Bell 2 carries the T shaped pull bracket 18, secured on the upper edge thereof, adapted to engage and pull downward the hooked lower end 19' of pull rod 19, the upper end of which is pivotally secured by pivot 19'' to the outer end of pull lever 20, pivotally secured to hanger 21' by pivot 20'. To the inner end of said lever is secured a hook 20'', engaging the free end portion of lever 16, for lifting the same, and thereby closing valve 11, when bell 2 is emptied of gas and fully lowered by the gravity thereof.

Hook 19' is provided with deflector 19$^a$, formed therewith, adapted to be contacted and deflected by bracket 18, for allowing the same to upwardly pass without engaging said hook.

Hanger 21' is secured to hanger bar 21, the rear end of which is pivotally mounted on cap 22$^a$ on the upper end of guide post 22 by pivot 21'', secured in said bar and loosely inserted in an aperture in said cap. The front end of said bar is detachably secured in a similar manner on cap 23$^a$, on the top of guide post 23, by stud 24, see Fig. 7.

Generator bell 2 is guided by bell guides 25, secured thereon, one of which is slidably and detachably secured on each of said guide posts by a hook 25', rotatably secured on said guide by rivet 25'', shown most clearly in Fig. 8.

Should valve lever weight 16' be inadvertently misplaced or from any cause fail to stop bell 2 in its upward movement, the guides of said bell stop the same, limited in their upward movement by caps 22$^a$ and 23$^a$, see Figs. 7 and 8. Said bell is provided with gas outlet pipe 26, which extends from a point above the level of the top of compartment 5, downward through the open bottom of bell 2, and through the bottom of tank 1, and is connected by T 26' with pipe 27, connected by T 27' with pipe 28, connected with spray pipes 28' having spray apertures 28'' therethrough, adapted to allow passage of gas therethrough into scrub water 29', in box 29, provided with plugged clean-out opening 29''.

Pipe 30 is extended from the upper interior portion of box 29, upward through the top thereof, and is connected with gas directing cock 31, provided with gate 31', which when in the position seen in Fig. 1, is adapted to direct gas through said cock into pipe 32, connected with filter pipe 33, by four-way fitting 32', and provided with gas tight plug 34 therein, and provided with apertures 35, adapted to permit passage of gas therethrough, into filter 36, filled with any well known filtering material 36'. Pipe 33, extends upward from fitting 32' through the bottom of gas storage tank 37 and filter 36 in said tank and out through the top of said filter, beneath which said pipe is provided with apertures 33', adapted to permit passage of gas from said filter into the upper portion of pipe 33, adapted to pass gas therefrom into gas storage bell 38.

Tank 37 is provided with water seal 37', therein, in which the lower, open end of storage bell 38 is submerged. In said tank is the filter 39, provided with filtering material 39', therein and with filter pipe 40, extending through the top and bottom thereof, and through the bottom of tank 37. Said pipe 40 is provided with apertures 40' and 40'' and with gas tight plug 41 therein, between said apertures. The lower end of said pipe is connected by four-way fitting 42 with pipe 43, connected by T 44 with pipe 45, provided with cock 46, with which is connected the gas distributing pipe 47, which is connected with any desired system of gas distributing pipes, not shown.

With the lower portion of four-way fitting 32' is connected the pressure relief pipe 48, and extended downward from said fitting, through and secured to the top of water seal box 49, filled with water 49'. With the lower portion of four-way fitting 42 is connected the relief pipe 50, extending downward from said fitting through and secured to the top of box 49. Both of said pipes extend in said box to points near the bottom thereof, the lower portions of same being filled with said water, forming water seals 49'' therein.

Water seal box 49 is provided with fill pipes 51 and 52, connected by T 51', provided with plugged clean-out opening 51'', and also provided with funnel 53, secured on the upper end of pipe 52 and provided with cap 53' having vent apertures 53'', formed therethrough, as seen in Fig. 1. Water seal box 49 and scrubber box 29 are communicatively connected by pipe 54.

Gas storage bell 38 is provided with sleeve guide 55, the closed upper end of which is secured to the top of said bell and the lower end thereof braced by transverse brace 55', (see Fig. 1.) Said sleeve has exhaust apertures 55'' formed through the lower portion thereof, adapted to be lifted by bell 38 above the top of water seal 37'. Said sleeve is slidably guided on guide pipe 56, which acts as a guide for said bell and also as a relief pipe therefor, as hereinafter described. Said pipe is secured to and extends through the bottom of tank 38 and has its lower end connected with six-way fitting 57, secured to fittings 32' and 42 by gas tight plugged nipples 57' and 57'' respectively. With the lower portion of fitting 57 is connected the relief nipple 58, extending downward therefrom, through and secured to the top of box 49.

Connected with the rear side of fitting 57 is the relief pipe 59, (see Fig. 2,) connected T 59' with exhaust pipe 60, connected by T 60' with the vertically extended exhaust pipe 60'', which is extended in any desired manner to the outside air.

Referring to Figs. 2 and 5, the by-pass exhaust pipes 61ª, communicatively connect port 31ᶜ in gas directing cock 31, with T 59', which together with the previously described exhaust pipes, provide exhaust conducting means from said port to said outside air. Cock gate 31' of said cock is provided with stem 62, the outer end portion of which is passed through pipe 63, and has grooved crank segment 64 secured on the outer end thereof. Said segment is provided with crank handle 65, secured thereto, and with pointer 65', see Fig. 6. On pipe 63 is secured the index plate 66, provided with index points 66ª, 66ᵇ and 66ᶜ. Rotatably secured to said index plate, below point 66ᶜ, is the grooved pulley 67.

The lower end of cable 68 is secured to segment 64, near pointer 65', and is passed therearound under pulley 67, and extends upward therefrom, over pulleys 69 and 69', rotatably secured to any desired fixed objects 70, by hangers 69''. Said cable is thus extended to any desired point, distant from the described machine, for rotating said cock gate, by heavy handle 68', secured on the free extremity of the thereby tensioned cable 68.

The front portion of the frame, on which the machine is supported is formed of pipe 63, supported at one of its ends in five-way fitting 7' supported on leg 7'', and at the other end in T 63', connected with fitting 57, by pipe 63''. T 63' is secured to plugged T 71, supported by leg 72, and by pipe 7, which connects fitting 7' with fitting 6'. The inner end of pipe 63'' is closed by plug 57ª, thereby closing the front opening of six-way fitting 57, seen in Fig. 2. The central portion of said frame is formed of T 73, supported on leg 73', and connected with fitting 6' by pipe 73'', nipple 27'', T 27', pipe 27, T 26', nipple 26'', cock 31, supported on leg 74, pipe 32, fitting 32', plug 57', fitting 57, plug 57'', fitting 42, pipe 43 and T 44, supported on leg 75. The rear portion of said frame is formed of leg 76, on which is secured the T 60', connected with pipe 60, connected with T 59' connected with pipe 59, connected with the central portion of said frame at fitting 57. Said rear portion of frame is also formed of leg 77, connected by T 77' with pipe 78, connected with fitting 6'.

On the fittings 60', 44 and 71 and on cock 31 (see Fig. 2) rests the foundation ring 79, (see Figs. 1 and 2,) on which gas storage tank 37 is supported. On the fittings 7', 73 and 77' and on cock 31 rests the foundation ring 80, on which generator tank 1 is supported.

In installation, the machine is placed in any desired room or cellar, and cock 46 is connected with the desired system of gas distributing pipes, not shown. Exhaust pipe 60'' is extended from the machine to the outside atmosphere, and cable 68 is extended as previously described.

Cap 53' is removed from fill pipe funnel 53 and water 49' is poured therethrough into box 49, said water extends therefrom through pipe 54 and fills both box 29 and box 49. In box 29 said water is seen as scrub water 29'.

Water seal 1' is placed in tank 1, and water seal 37' is placed in tank 37.

In order to place carbid pans 3, 3ª, to 3ᵈ as seen in Figs. 1 and 2; weight 16' is manually lifted from engagement with hook 20'' and bar 21 is rotated laterally on pivot 21'', from the position seen in Fig. 7, to the position seen in Fig. 8 and weight 16' is allowed to gravitate and rotate valve lever 16 from over bell 2.

Hooks 25' are rotated on rivets 25'' from the position shown in Fig. 6 to the position seen in Fig. 8. Bell 2 is thus released from guide posts 22 and 23 and is then rotated from the position seen in Fig. 6, to the position seen in Fig. 8. Said bell is manually lifted from tank 1.

Carbid pan retainers 3ᵉ are rotated on their fastenings 3ᶠ upward and outward from the position seen in Fig. 7, to a position, (not shown,) outside of generator 5, thereby clearing said generator of all obstruction, after which said carbid pans are placed in position seen in Figs. 1 and 7, with carbid 3ᵍ previously placed therein, and the parts are returned to the position seen. Drain faucet 7ª is closed, pull rod 19, carrying hook 19' is manually rotated on pivot 19″ allowing bracket 18 to be carried downward to a point below said hook, which is done by gravitation of bell 2. Tank 10 is filled with water through fill tube 10′, after which the machine is ready for use.

In operation, water passes from tank 10 through strainer 12, valve 11, and the previously described water conducting means into compartment 5 and onto carbid $3^g$, in pan 3. Gas is thus generated, which passes from said pan, between the upper edge thereof and the bottom of pan $3^a$, in and upward through compartment 5 and downward through the previously described gas conducting means, into and upward through scrub water 29′, and is thereby scrubbed and separated from impurities and solid matter, which latter gravitates and rests on the bottom of box 29. Said gas rises as stated into the upper portion of box 29 and passes thence through the previously described gas conducting means and through cock 31 and filter 36, and is filtered through filtering substance 36′ thence into storage bell 38, thence from said bell downward through filter 39, filtered by filtering material 39′, and thence through the previously described gas conducting means, and cock 46, filling the previously mentioned system of gas distributing pipes, not shown. Bell 2 by increasing pressure of gas therein, is raised thereby carrying bracket 18 against deflector $19^a$, thereby moving hook 19′ outward, thus preventing engagement of bracket 18 with said hook. Said bell continues to rise, guided by the previously described guiding means, and contacts and lifts weight 16′, thereby closing valve 11, upon which the upward movement of said bell is stopped by said weight. Upon the closing of said valve, the feeding of water on carbid $3^g$ is thereby stopped. The thus wet carbid thereafter, continues for a time to generate gas, the increasing pressure of which is communicated through the previously described gas conducting means to the interior of bell 38, upon which said bell is thereby raised, storing the thus increased volume of gas therein. Normally, bell 38 holds said increased volume of gas, but when the same becomes excessive in pressure, bell 38 is thereby raised, still farther, and carries guide sleeve apertures 55″ above the surface of water seal 37′, upon which said excess of stored gas escapes from said bell through said apertures, downward through guide pipe 56, and fitting 57, outward through pipe 59, exhaust pipe 60, (see Fig. 2,) fitting 60′, upward through exhaust pipe 60″, and thence into the open air. Bell 38 being thus relieved of excess gas is lowered by the gravity thereof to normal position, with apertures 55″ below the surface of water seal 37′. Thus providing primary pressure relieving means, whereby excessive pressure of gas in said bell and all other parts of the machine is automatically relieved.

Referring to Figs. 1 and 2, should any article of weight, be inadvertently placed on bell 38, or the same be prevented from rising by any other cause, said excessive pressure of gas passes from fittings 32′ and 42, into relief pipes 48 and 50 and forces water seals 49″ therefrom, into box 49, after which said excess gas in bell 38 escapes therefrom downward through the gas conducting means of filters 36 and 39, as previously described, and through said relief pipes 48 and 50 into water 49′, and rises therethrough into the upper portion of box 49, and thence through pipe 58, fitting 57, pipe 59, and the previously described exhaust pipes, to the open air. Thus providing secondary relieving means, whereby excessive pressure of gas in bell 38 and all the gas containing parts of the machine is automatically relieved.

It will readily be understood that since all the described gas containing parts are in communication with each other, excessive pressure in all of said parts is relieved through their described communicating means, by both the described primary and secondary pressure relieving means. When said gas is used through pipe 47, and said pressure of same is thereby lowered, bell 38 gravitates, and upon further use of gas, and lowering of the pressure of same, bell 2 gravitates from weight 16′, thereby freeing said weight, which gravitates and opens valve 11, which again admits water into compartment 5. Gas is thus again generated, and the described operations are repeated, and so on.

During the described operations, water $10^b$ rises in compartment 5, until carbid $3^g$ in pan 3 is slacked and neutralized, and said pan is filled with water, after which said water rises around carbid pan $3^a$, and so on until said pans are all similarly filled with water in succession and all the carbid therein is thus slacked. When water $10^b$ has thus risen in compartment 5, the operator sees the same, and closes cock 9″, thereby stopping further feeding of water into compartment 5. Said operator then manually presses bell 2 down, thereby forcing all the gas therefrom, into bell 38, and then rotates crank 65 upward, (see Fig. 6) until he sees that pointer 65′ is carried from point $66^a$ into register with point $66^b$, thereby rotating cock gate 31 from the position seen in Fig. 1 to the position seen in Fig. 3, thereby closing said cock against return flow of gas therethrough from bell 38. Faucet $7^a$ is opened and water $10^b$ is drawn therethrough from compartment 5, into any suitable vessel, not shown. The parts above bell 2 are moved from over said bell, which latter is removed from tank 1, the described carbid pans are removed from compartment 5, emptied cleaned and dried, recharged with fresh carbid, and replaced as seen, by the previously described charging operations. Faucet 7ᵃ is closed, cock 9″ is opened, and cock gate 31 is reversely rotated to the position seen in Fig. 1, after which the previously described operations of generating and of storing gas are repeated, until all of said carbid is slacked, and so on.

When it is desired to exhaust all the gas from both bells 2 and 38 and from their gas conducting means, cock gate 31′ is rotated by crank 65, from the position seen in Fig. 1 to the position seen in Fig. 4. This position is seen to have been reached when pointer 56′ (see Fig. 6) is in register with point 66ᵉ, on index plate 66. This position of cock gate 31′ places the previously described gas conducting means through said cock 31 in communication with by-pass exhaust pipe 61ᵃ, (see Fig. 4,) upon which all of the gas in said machine is exhausted therethrough and out to the open air through the previously described gas exhaust pipes. When by reason of fire near said machine, or from any other cause, it is desired to operate said exhausting means from a point distant from said machine, the operator grasps handle 68′, (see Fig. 6,) and thereby pulls cable 68 downward as far as possible, thereby rotating crank segment 64 to the full limit of its rotation, upon which the previously described exhausting of gas takes place.

In both cases of gas exhaustion as described, bell 2 gravitates to the full limit of its downward travel, bracket 18 engages hook 19′, and by pull rod 19 and connected parts, closes valve 11, thereby stopping further feeding of water onto carbid 3ᵍ, and consequently stopping further generation of gas.

Having fully described my invention, what I claim as new and desire to secure by Letters Patent is:—

1. In a machine of the character described, a generator bell adapted to be raised by pressure of gas therein and to be lowered by the gravity thereof; a generator compartment in communication with said bell; carbid holding means, adapted to hold calcium carbid in said compartment; a feed water tank; water conducting means, adapted to feed water from said tank into said compartment and onto said carbid; a valve adapted to close said water conducting means, said valve being provided with a water strainer and with a stem therefor, projecting upward therefrom; a pivotally mounted valve lever, one end of which is pivotally connected with said valve stem, the other or free end of said valve lever being provided with a weight thereon, adapted to be lowered by the gravity thereof, for opening said valve, and to be lifted by said bell for closing said valve, when said bell is raised; a pivotally mounted pull lever, one end of which is provided with a pull rod pivotally secured thereto and depending therefrom at one side of said bell, said rod being provided with a hook on the lower end thereof having a deflector formed therewith; a pull bracket secured to said bell, said hook being adapted to be engaged by said bracket for pulling said rod downward, and to be deflected from engagement with said bracket, by said deflector during upward travel of said bracket; and disengageable engaging means on the other end of said pull lever, whereby the free end portion of said valve lever is engaged, for lifting the same and thereby closing said valve when said bell is fully lowered.

2. In an acetylene gas machine, in combination, a scrubber box and a water seal box, said boxes being adapted to hold water therein and being provided with communicating means connected therewith near the bottom thereof; a fill tube, connected with said water seal box, near the bottom thereof, and extending upward therefrom to a point above the level of the top of said water seal box; gas spraying means in said scrubber box, near the central portion thereof; an acetylene gas generator above said scrubber box; generator conducting means connected with said spraying means and adapted to conduct gas into the same from said generator; a relief pipe adapted to exhaust gas from the upper portion of said water seal box said relief pipe being connected with exhaust pipes opening into the open air; a plurality of water seal pipes, extending downward through the top of said water seal box, to points therein near the bottom thereof; gas storing means above said water seal box; gas storage conducting means, whereby gas is normally conducted from the upper portion of said scrubber box, into the upper ends of said water seal tubes and into said storing means; a gas directing cock in said storage conducting means, and by-pass exhausting means connected with said exhaust pipes adapted to conduct gas from said storage conducting means upon a one half rotation of said cock.

3. In an acetylene gas machine in combination, a generator provided with a bell therefor adapted to be raised by generation of gas in said generator; a feed water tank adapted to have water fed therefrom into said generator by the gravity of said water; water feeding means adapted to feed water therethrough as stated; a valve in said tank, adapted to close said water feeding means; a stem for said valve projecting upward therefrom; a strainer around said valve and the lower end portion of said valve stem and extending upward from said valve through the top of said tank; an apertured cap on the top of said strainer, said cap having said valve stem passed therethrough and extending upward therefrom; pivot supporting means mounted on said tank adjacent to said stem; a valve lever pivotally mounted on said support, said lever having one of its ends pivotally secured to the upper end of said stem, and its other or free end provided with a weight thereon, adapted to gravitate and thereby open said valve, and be lifted by the previously mentioned generator bell for closing said valve.

In testimony whereof I affix my signature in the presence of two witnesses.

EDWARD F. KAPUS.

Witnesses:
   JOHN J. HINTON,
   GERTRUDE CAMPION.